United States Patent
Schaller

(10) Patent No.: US 11,946,586 B2
(45) Date of Patent: Apr. 2, 2024

(54) BLOCKING DEVICE CAMERA HOLDER WITH BLOCKING DEVICE

(71) Applicant: ARNOLD & RICHTER CINE TECHNIK GMBH & CO. BETRIEBS KG, Munich (DE)

(72) Inventor: Curt Schaller, Munich (DE)

(73) Assignee: ARNOLD & RICHTER CINE TECHNIK GMBH & CO. BETRIEBS KG, Munich (DE)

( * ) Notice: Subject to any disclaimer, the term of this patent is extended or adjusted under 35 U.S.C. 154(b) by 0 days.

(21) Appl. No.: 17/877,939

(22) Filed: Jul. 30, 2022

(65) Prior Publication Data
US 2023/0132829 A1 May 4, 2023

(30) Foreign Application Priority Data
Jul. 30, 2021 (DE) ...................... 20 2021 104 086.6

(51) Int. Cl.
*F16M 11/04* (2006.01)
*G03B 17/56* (2021.01)

(52) U.S. Cl.
CPC ......... *F16M 11/041* (2013.01); *F16M 11/043* (2013.01); *G03B 17/561* (2013.01)

(58) Field of Classification Search
CPC .. B23Q 3/00; B23Q 3/067; B23Q 3/06; B25B 1/00; B25B 1/02; B25B 1/08; F16M 11/04; F16M 11/041; F16M 11/043; G03B 17/561

USPC ........... 248/220.21, 220.22, 221.11, 222.11, 248/222.13, 222.51, 222.52, 177.1, 178.1, 248/187.1, 176.3; 269/43, 45
See application file for complete search history.

(56) References Cited

U.S. PATENT DOCUMENTS

| 2,840,334 | A   |   | 6/1958 | Cauthen |
| 3,429,543 | A   | * | 2/1969 | Mooney ............... F16M 11/041 248/346.04 |
| 6,435,738 | B1  | * | 8/2002 | Vogt ....................... F16M 13/00 396/419 |

(Continued)

FOREIGN PATENT DOCUMENTS

DE  10 2007 035 562 A1  1/2009
DE  10 2008 061 980 A1  6/2010

(Continued)

OTHER PUBLICATIONS

European Search Report in Application No. 22187552.9 dated Jan. 2, 2023.

*Primary Examiner* — Alfred J Wujciak
(74) *Attorney, Agent, or Firm* — Maschoff Brennan

(57) ABSTRACT

A blocking device is configured for blocking a dovetail plate that is flush-mounted in a track of the blocking device. The blocking device includes a base defining a side of the track and a clamping block arranged to be laterally displaceable on the base. The clamping block has a blocking side facing the track and a clamping side opposing the blocking side. A spacing between the blocking side and the clamping side varies in a direction parallel to the longitudinal extent of the track. The blocking device further includes a clamping lever that is rotatably arranged on the base and has a handpiece and an eccentric part. The eccentric part acts on the clamping side for displacing the clamping block.

16 Claims, 4 Drawing Sheets

(56) References Cited

U.S. PATENT DOCUMENTS

| | | | |
|---|---|---|---|
| 6,773,172 B1 * | 8/2004 | Johnson | F16M 13/00 |
| | | | 396/428 |
| 8,348,214 B2 | 1/2013 | Vogt | |
| 8,794,575 B2 * | 8/2014 | Vogt | F16M 11/041 |
| | | | 396/419 |
| 8,821,044 B1 * | 9/2014 | Dordick | F16M 11/041 |
| | | | 248/689 |
| 10,584,935 B1 | 3/2020 | Afshari | |
| 2003/0090048 A1 * | 5/2003 | Varzino | B25B 1/08 |
| | | | 269/95 |
| 2003/0218108 A1 * | 11/2003 | Werner | F16M 11/2014 |
| | | | 396/419 |
| 2005/0041966 A1 * | 2/2005 | Johnson | G03B 17/566 |
| | | | 396/428 |
| 2011/0315840 A1 | 12/2011 | Connolly et al. | |
| 2012/0145864 A1 | 6/2012 | Vogt | |

FOREIGN PATENT DOCUMENTS

| | | |
|---|---|---|
| DE | 10 2009 038 823 A1 | 3/2011 |
| DE | 102009038823 A1 | 3/2011 |
| DE | 10 2011 013 552 A1 | 9/2012 |
| EP | 2322839 A2 | 5/2011 |
| EP | 3 064 823 A1 | 9/2016 |
| KR | 20110068437 A | 6/2011 |

* cited by examiner

BLOCKING DEVICE CAMERA HOLDER WITH BLOCKING DEVICE

The invention relates to a blocking device and a camera holder.

For mounting cameras on holders, for example on a tripod, so-called dovetail plates are frequently used. To this end, the dovetail plate is fastened to the camera and for mounting the camera the dovetail plate is flush-mounted in a track of the blocking device and blocked therein. The blocking device is fastened to the holder.

In known solutions, problems frequently arise when flush-mounting the dovetail plate in the track of the blocking device, for example due to tilting or due to the dimensions of the track, on the one hand, and the dovetail plate, on the other hand, not exactly matching one another.

The object of the present invention is to propose a blocking device for blocking a dovetail plate which is flush-mounted in a track of the blocking device, which, on the one hand, permits a simple flush-mounting of the dovetail plate and, on the other hand, ensures a secure blocking.

Proceeding therefrom, the blocking device of the independent claim 1 is proposed. Features of several exemplary embodiments described herein by way of example are specified in the subclaims. Additionally, a camera holder with such a blocking device is proposed.

Further details and advantages of the invention will become apparent in the following description of several exemplary embodiments with reference to the figures.

In which.

Figure 1:
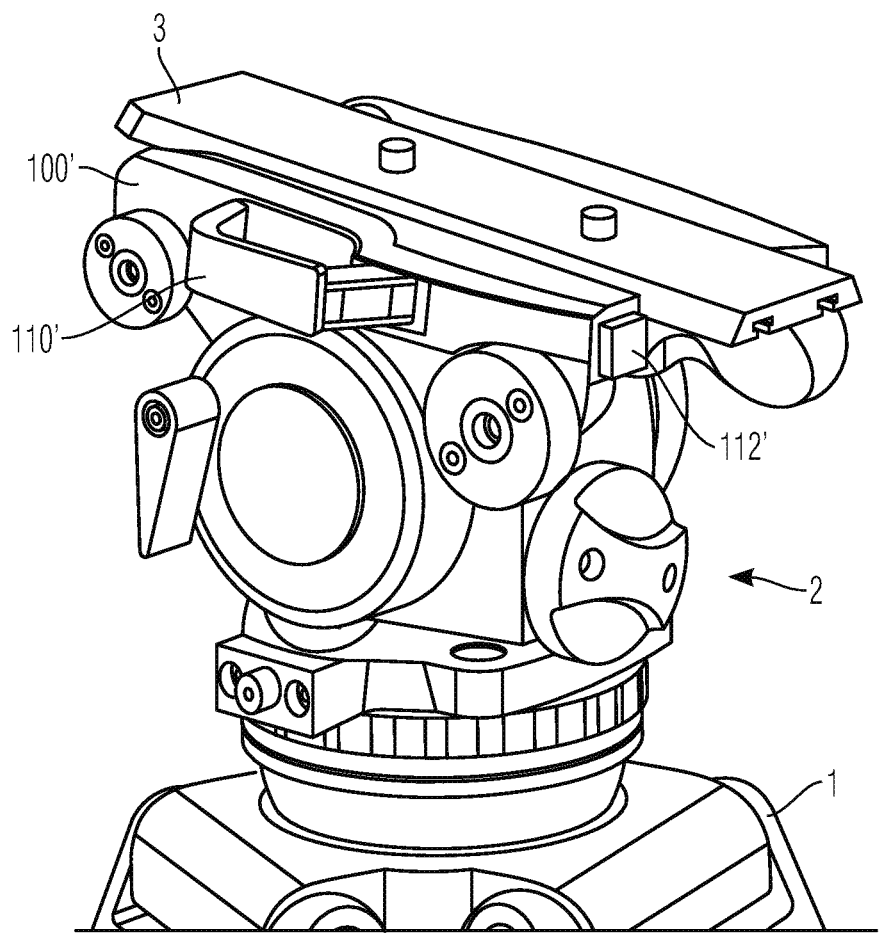
FIG. 1 shows by way of example and schematically a camera holder.

FIG. 1 shows by way of example and schematically a camera holder with a tripod 1 and a joint arrangement 2. A blocking device 100' for blocking a dovetail plate 3 which has been flush-mounted in a track of the blocking device 100', for example by being inserted from the side, is located on the joint arrangement 2. A clamping element 110' is provided for blocking the dovetail plate 3, said clamping element being able to be manually actuated and blocking the flush-mounted dovetail plate 3 by preventing a movement of the dovetail plate 3 along the longitudinal extent of the track. The blocking is released by the push button 112' being actuated.

The blocking device 100' shown in FIG. 1 has proved to be unsafe and impracticable: firstly it is possible for the dovetail plate 3 to slide out by inadvertent actuation of the push button 112' and secondly the dovetail plate has to be flush-mounted in the track with a "precise fit".

Figure 2:
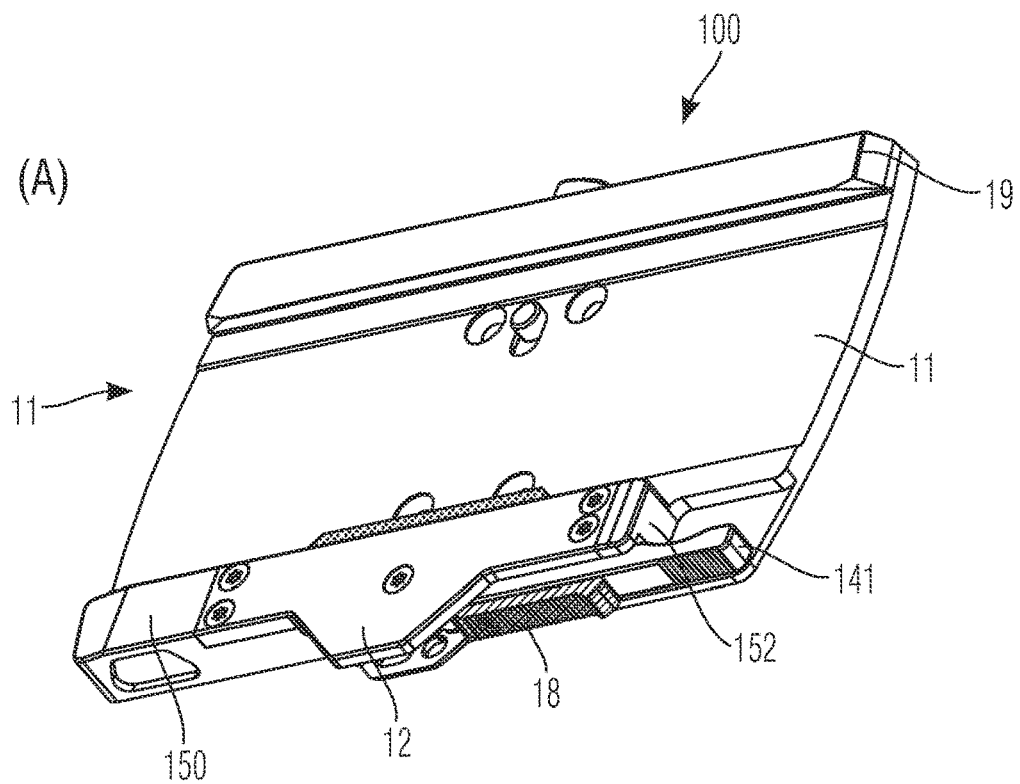
FIG. 2 shows by way of example and schematically four perspective views (A) to (D) of a blocking device according to one embodiment.
Figure 2:
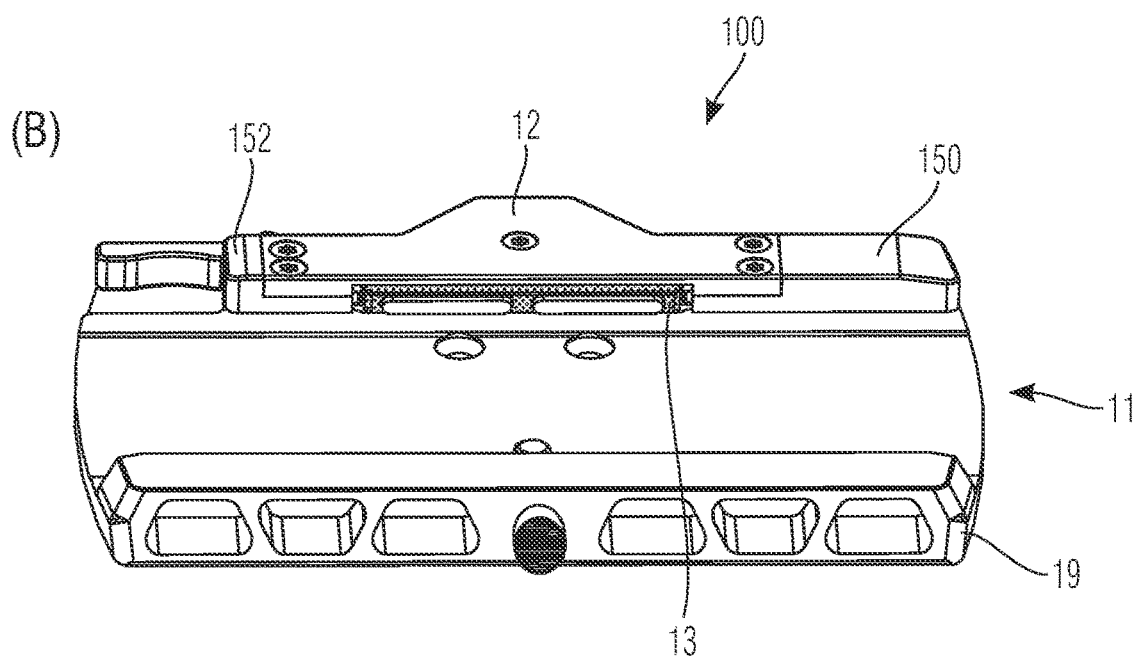
Figure 2:
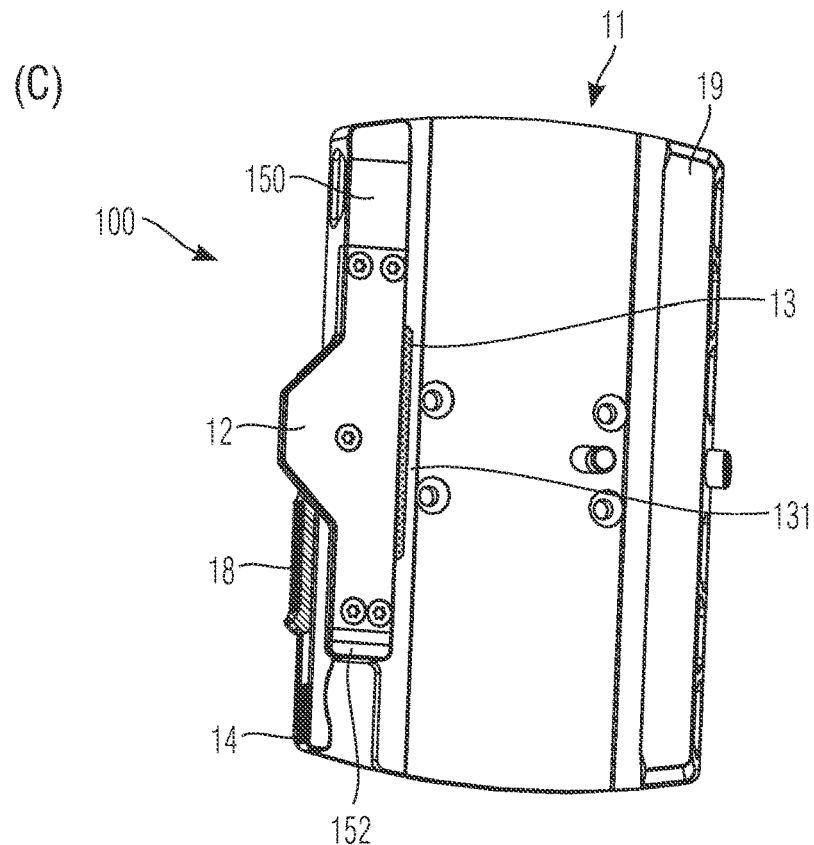
Figure 2:
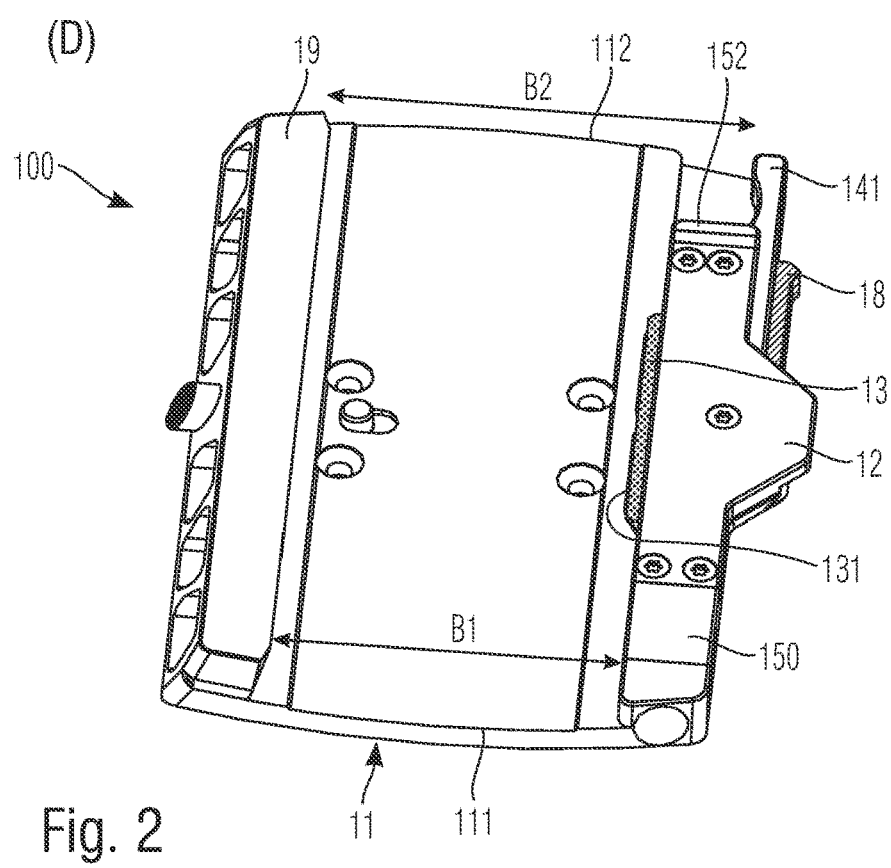
Figure 3:
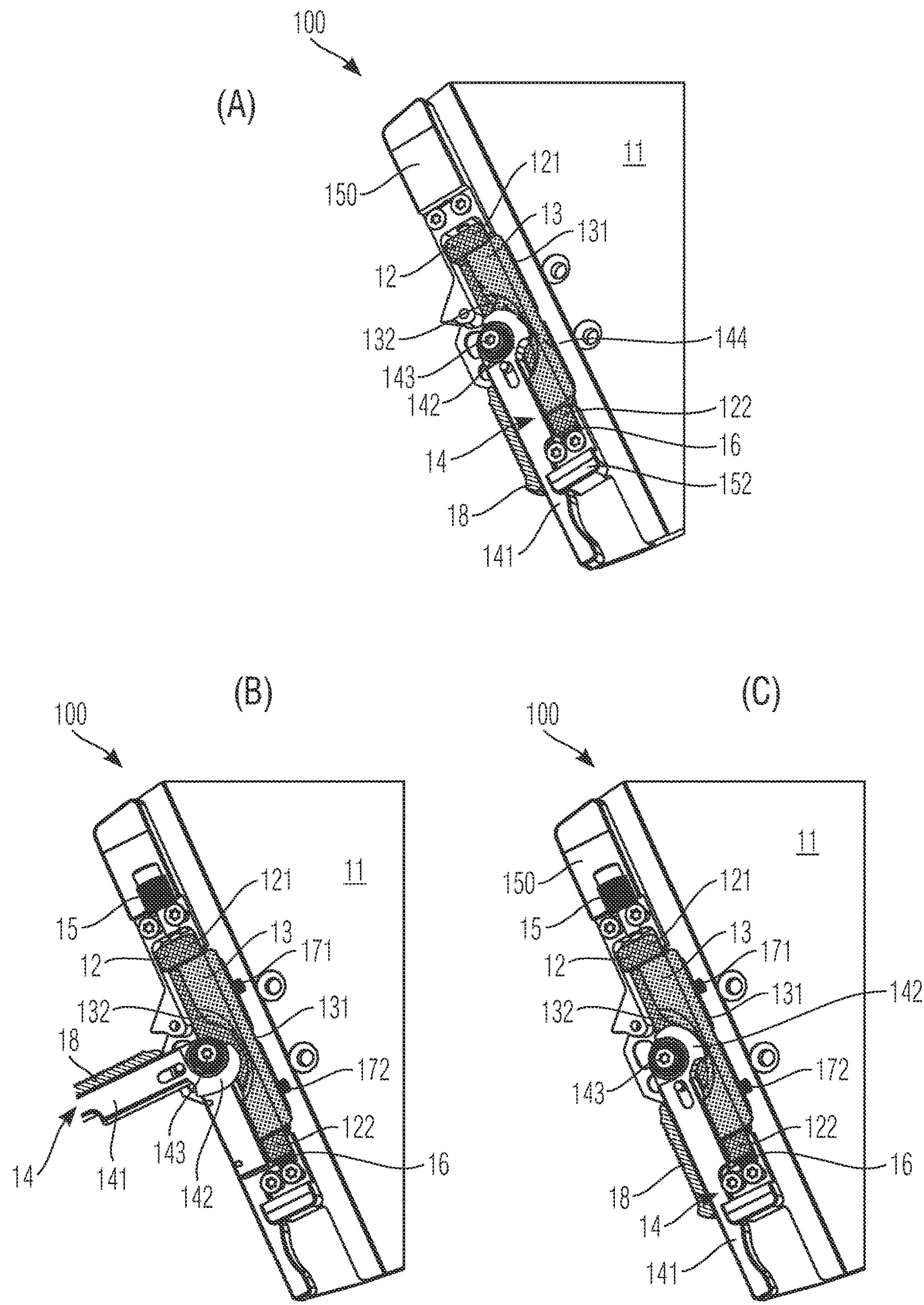
FIG. 3 shows by way of example and schematically three perspective views (A) to (C) of a blocking device according to one embodiment.

FIG. 2 shows four views (A) to (D) of an embodiment of a blocking device 100 according to the invention which remedies these drawbacks. Reference is made hereinafter to FIG. 3:

The blocking device 100 for blocking a dovetail plate 3, which is flush-mounted in a track 11 of the blocking device 100, comprises a base 12 defining a side of the track 11. The other side of the track 11 is defined by an oblique side wall 19, the angle thereof relative to the base of the track 11 being selected so as to correspond to the dovetail plate 3.

The term "track" which is used herein is not intended to imply that the dovetail plate 3 may only be flush-mounted in the blocking device 100 from the side (so-called "back loader" or "front loader"). Whilst this is possible, an insertion of the dovetail plate 3 from above ("top loader") may also be possible.

A housing part 150 may define a first track width B1 on a first end portion 111 of the track 11 with the opposing side wall 19 (see FIG. 2 (D)) A second housing part 152 may define a second track width B2 on a second end portion 112 of the track 11 with the opposing side wall 19, said second track width being larger than the first track width B1. This may facilitate the insertion of the dovetail plate 3 from the side, on the second end portion 112 of the track 11.

The blocking device 100 further comprises a clamping block 13 which is arranged so as to be laterally displaceable on the base 12, said clamping block having a blocking side 131 facing the track 11 and a clamping side 132 opposing the blocking side 131. A spacing between the blocking side 131 and the clamping side 132 varies in a direction parallel to the longitudinal extent of the track 11. For example, to this end the clamping side 132 is curved, as shown, which additionally saves space. The blocking side 131 for blocking the dovetail plate 3 acts on a side surface of the dovetail plate 3 and may be arranged, as is the side wall 19, at a corresponding angle to the surface of the track 11. For improved blocking of the dovetail plate 3, the blocking side 131 which is configured to be flat, for example, may be provided with a friction pad, for example a rubber pad.

The blocking device 100 also comprises a clamping lever 14 which is rotatably arranged on the base 12 and which has a handpiece 141 and an eccentric part 142, wherein the eccentric part 142 acts on the clamping side 132 for displacing the clamping block 13. The handpiece 141 and the eccentric part 142 are coupled together, for example, via a pivot pin 143. The rotation of the handpiece 141 about the pivot pin 143 brings about the action of the eccentric part 142 on the clamping side 132. This brings about the displacement of the clamping block 13 in the direction of the track 11 and thus the action of a clamping force on the dovetail plate (not shown in FIGS. 2 and 3). In this manner, the dovetail plate 3 is blocked.

A defining surface 144 (see dashed line in FIG. 3(A)) which is defined by the contact between the eccentric part 142 and the clamping side 132 is not located parallel to the blocking side 131 when the clamping lever 14 is positioned for locking the dovetail plate 3 (FIG. 2 (A) to (D) and FIGS. 3 (A) and (C)) To this end, the eccentric part 142 is designed, for example, to be conically convex and the clamping side 132 is designed to be conically concave.

In one embodiment, the base 12 and the clamping block 13 are displaceably arranged parallel to the longitudinal extent of the track 11 and relative to the pivot pin 143 of the eccentric part 142. Additionally or alternatively, the pivot pin 143 of the eccentric part 142 may also be arranged so as to be displaceable parallel to the longitudinal extent of the track 11. Due to the variable spacing between the clamping side 132 and the blocking side 131, the spacing between the defining surface 144 and the pivot pin 143 may be adjusted in a variable manner. Thus the track width defined by the clamping block 13 and the side wall 19 is also adjustable in a variable manner, or the clamping force (or the contact pressure) exerted by the clamping block on the dovetail plate 3. In this manner, the blocking device 100 may receive dovetail plates of different widths, in particular even those dovetail plates which have a smaller width than the track 11, as is defined by the housing parts 150 and 152, on the one hand, and the side wall 19, on the other hand.

Instead of a curved clamping side 132, a clamping side 132 which runs in a linear manner could also be provided, said clamping side being arranged at an angle to the blocking side 131 in order to achieve the variable spacing between the clamping side 132 and the blocking side 131.

The blocking device comprises an adjusting means 15, for example an adjusting screw, in order to bring about the longitudinal displacement of the base 12. The adjusting means 15 may be provided in the housing part 150 which, on the one hand, forms a side wall portion opposing the side wall 19 and, on the other hand, adjoins the base 12, as shown. Due to the geometric shapes of the eccentric part 142 and the clamping side 132, therefore, the adjusting means 15 permits the adjustment of the clamping force. Additionally, a counter pressure means 16, for example a compression spring, which counteracts the longitudinal displacement of the base 12 may be provided. The counter pressure means 16 is accommodated, for example, in the further housing part 152 which, on the one hand, forms a further side wall portion opposing the side wall 19 and, on the other hand, adjoins the base 12.

The clamping lever 14 and, in particular, the pivot pin 143 thereof are preferably fixedly arranged and are not displaced by the actuation of the adjusting means 15.

The clamping block 13 may be floatingly mounted. To this end, the base is configured, for example, as a slide in which the clamping block 13 is arranged so as to be laterally displaceable. For example, the clamping block 13 is mounted so as to be displaceable between two end portions 121, 122 of the base, perpendicular to the longitudinal extent of the track 11. The slide which is located, for example, in a U-shaped manner below the clamping block 13 ensures that when the clamping is released, the clamping block 13 is moved away uniformly and parallel from the side edge of the dovetail plate and thus is fully opened. Compression springs 171 and 172, which push the clamping block 13 in the direction of the eccentric part 142, may also be provided (see FIGS. 3 (B) and (C)).

In one embodiment, the blocking device comprises a securing element 18 which is movably mounted between a first position and a second position, wherein the rotatability of the clamping lever 14 is blocked when the securing element 18 is in the first position (see FIGS. 3 (A) and (C)). The securing element 18 is mounted in the first position, for example, by pretensioning.

The securing element is arranged on the handpiece 141 and has to be manually transferred into the second position, for example by displacement, in order to actuate the clamping lever 14 (FIG. 3 (B)).

In one embodiment, the blocking device 100 is configured to function both as a top loader, front loader and back loader, i.e. to permit the dovetail plate 3 to be flush-mounted from above, and also by insertion starting from the two end portions 111 and 112.

Due to the displaceability of the clamping block 13 along the longitudinal extent of the track 11, the extent of the lateral displacement of the clamping block 14 and thus the clamping force may be adjusted. Thus it is possible for different dovetail plates to be blocked or for tolerances in the geometric dimensions of the dovetail plate to be accepted.

The base of the track 11 may be configured to be entirely planar and does not necessarily have to have securing elements for securing the blocking of the dovetail plate.

The handpiece 141 may be rotated, for example, by 90°. In the non-blocked state, the handpiece 141 is located approximately at a 90° angle to the longitudinal extent of the track 11 (FIG. 3 (B)). In the blocked state, the handpiece 141 is located flat and flush with the further housing part 152. In a central position, not shown here, the handpiece 141 is located approximately at a 90° angle to the longitudinal extent of the track 11; then the flush-mounted dovetail plate 3 may still be pushed forward and back, but no longer pivoted out of the track.

The invention claimed is:

1. A blocking device for locking a dovetail plate which is flush-mounted in a track of the blocking device, the blocking device comprising:
    a base defining a side of the track;
    a clamping block which is arranged so as to be laterally displaceable on the base, said clamping block having a blocking side facing the track and a clamping side opposing the blocking side, wherein a spacing between the blocking side and the clamping side varies in a direction parallel to the longitudinal extent of the track; and
    a clamping lever which is rotatably arranged on the base and which has a handpiece and an eccentric part, wherein the eccentric part acts on the clamping side for displacing the clamping block,
    wherein a defining surface which is defined by the contact between the eccentric part of the clamping lever and the clamping side of the clamping block is not located parallel to the blocking side of the clamping block when the clamping lever is positioned for locking the dovetail plate.

2. The blocking device according to claim 1, wherein the base and the clamping block are displaceably arranged parallel to the longitudinal extent of the track and relative to a pivot pin of the eccentric part of the clamping lever.

3. The blocking device according to claim 2, further comprising an adjusting screw provided in a housing part adjoining the base, wherein the adjusting screw is provided in order to bring about the longitudinal displacement of the base.

4. The blocking device according to claim 3, further comprising a compression spring accommodated in a further housing part adjoining the base, wherein the compression spring counteracts the longitudinal displacement of the base.

5. The blocking device according to claim 1, wherein the clamping side of the clamping block is floatingly mounted.

6. The blocking device according to claim 1, wherein the base is configured as a slide, in which the clamping side of the clamping block is arranged so as to be laterally displaceable.

7. The blocking device according to claim 1, further comprising at least one compression spring which pushes the clamping side of the clamping block in the direction of the eccentric part of the clamping lever.

8. The blocking device according to claim 1, wherein the eccentric part of the clamping lever is designed to be conically convex.

9. The blocking device according to claim 1, wherein the clamping side of the clamping block is designed to be conically concave.

10. The blocking device according to claim 1, wherein the blocking side of the blocking block is provided with a friction pad.

11. The blocking device according to claim 1, further comprising a securing element which is movably mounted between a first position and a second position, wherein the rotatability of the clamping lever is blocked when the securing element is in the first position.

12. The blocking device according to claim 11, wherein the securing element is mounted in the first position by pretensioning.

13. The blocking device according to claim 1, wherein the eccentric part of the clamping lever acts on the clamping side of the clamping block for displacing the clamping block in the region in which the spacing varies between the blocking side and the clamping side in the direction parallel to the longitudinal extent of the track.

14. A camera holder comprising the blocking device according to claim 1.

15. The blocking device according to claim 11, wherein the base and the clamping block are displaceably arranged parallel to the longitudinal extent of the track and relative to a pivot pin of the eccentric part.

16. The blocking device according to claim 1, wherein the base is configured as a slide, in which the clamping block is arranged so as to be laterally displaceable.

\* \* \* \* \*